Figure 1:
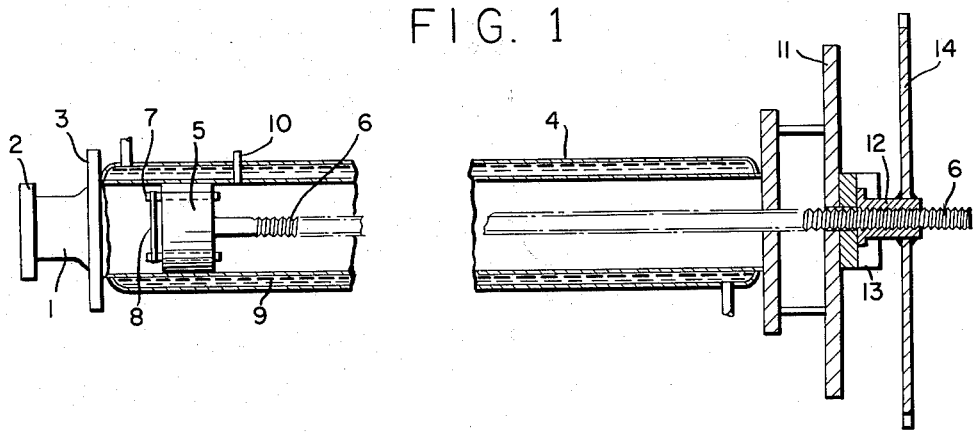

Dec. 6, 1960  R. G. ALSUP ET AL  2,962,760
FORMATION OF ROD STOCK FROM THERMOPLASTIC MATERIALS
Filed Jan. 16, 1958

INVENTOR
JOHN HAROLD MILLER
RICHARD GLENN ALSUP
PHILIP ERVIN LINDVIG

BY  *A. McAlevy*

ATTORNEY

United States Patent Office 2,962,760
Patented Dec. 6, 1960

2,962,760

FORMATION OF ROD STOCK FROM THERMOPLASTIC MATERIALS

Richard Glenn Alsup, Wilmington, Del., Philip Ervin Lindvig, Boothwyn, Pa., and John Harold Miller, Newark, Del., assignors to E. I. du Pont de Nemours and Company, Wilmington, Del., a corporation of Delaware Filed Jan. 16, 1958, Ser. No. 709,273

1 Claim. (Cl. 18—30)

This invention relates to improvements in the manufacture of rod stock from thermoplastic materials, especially nylon and polyformaldehyde resins.

Heretofore, the production of void-free elongated objects by extrusion of thermoplastic materials has involved various techniques, such as (1) the use of lubricants under pressure to separate the solidified article from the forming wall; (2) movable plugs or closure members to seal elongated molds while permitting change in volume corresponding with the cooling of resin melts; (3) friction brakes, applied to the extruded stock, to control rate of continuous withdrawal from a forming tube; and (4) pressure-sensitive controls for varying the speed of an extruder screw, continuously feeding an elongated open-ended mold, to assure the uniformity which attends constancy of pressure drop across such a mold.

While these various techniques have produced advantageous results especially in the production of rod by extrusion of thermoplastic materials having a low melt viscosity, there have been various mechanical problems which still remained unsolved. The magnitude of the forward thrust, under optimum conditions hereinbelow described, is so high that it is difficult to maintain a constant pressure with a simple friction brake. This is especially true in the extrusion of large diameter rods (e.g. rods having a diameter of about 2 inches or more), the effect of rod diameter varying from one resin to another to some extent. This is true because the total force required to hold back or brake a rod undergoing extrusion increases with the square of the rod diameter, and for large diameters the magnitude of the force to be dissipated by the braking action is larger than can be handled by any available friction brake. An even more serious difficulty occurred when prior art methods were tested in the extrusion of elongated shapes from resins having a large percentage crystallinity (after solidification) and a rate of crystallization faster than that of nylon, for example. Such resins having a relatively fast rate of crystallization tend to form rod having an elongated central zone of pithy structure, as hereinafter explained in further detail. This pithy zone is especially undesirable since objects formed from the rod by cutting, stamping, etc., contain the same defect at least to some extent.

An object of the invention is to eliminate these disadvantages in prior methods for extruding elongated shapes. A further object is to provide methods for extruding polyformaldehyde resin (superpolyoxymethylene), especially in the form of rods having a diameter in excess of 2 inches. A still further object is to produce superpolyoxymethylene rod which is free of a pithy central portion, and which has a diameter in excess of 2 inches. Other objects will appear hereinafter.

These objects are accomplished, in accordance with the present invention, by the method and apparatus hereinbelow described. The method comprises feeding molten thermoplastic material, preferably by means of an extruder, into a mold having suitably a cylindrical internal cross-section and closed by means of a piston capable of traversing all or a part of the length of the mold. The motion of the piston, along the length of the mold, is controlled, as hereinbelow explained, so that its rate of forward motion is slow enough to eliminate the presence of any central portion having poorer physical properties differing from those in the remainder of the rod. In a preferred embodiment, the forward motion of the piston is controlled by means of a threaded shaft, adapted to control the position of the piston. The threaded shaft engages a correspondingly threaded bore in a sprocket wheel, which rotates at a rate controllable for example by means of a variable speed motor.

When the thermoplastic material is nylon, there is a pronounced advantage in providing a gripping device whereby the solidified shape can be pulled away from the extruder while at the same time serving to apply a braking action. The function of the gripping device is to overcome the rather substantial frictional pull or adhesion which exists between the nylon and the wall of the mold in the zone adjacent the extruder, i.e. before the contraction of the solidified shell and the action of the lubricant comes into play to relieve this adhesion.

Also, when the thermoplastic material is nylon, or other high melting resin, it is essential to separate the forming device from the extruder by means of communicating device, or gasket, composed of a non-metallic heat insulator, suitably one made of polytetrafluoroethylene reinforced with glass fibers. This is generally unnecessary with resins which melt at temperatures below about 20° C. The cooling jacket at the mold has a temperature of 0° to 50° C., preferably 0° to 20° C., in any case.

The invention is further illustrated by means of the accompanying drawing.

Figure 1 is a cross-section view of a mold or forming box suitable for use in the method herein disclosed. An adapter 1 equipped with flanges 2 and 3 provides means for supplying feed from an extruder (not shown) to the forming box 4. The temperature and melt pressure of the melted resin may be measured at the adaptor, if desired. A movable snug fitting piston 5 is held against the extruded resin by means of a power driven threaded shaft 6. Lag bolts 7 support a suitable strap 8 which serves to grip the solidified resin as it cools, thereby causing it to move with the piston 5. This strap is quite important in the production of nylon rod, but is not always needed in shaping various other resins. The body of the forming box 4 is encased in a water cooled jacket 9. An oil port 10 is provided which permits the introduction of low pressure oil between the inside wall of the forming box and the solidified surface of the resin. At the end of the forming box opposite the extruder is mounted a fixed plate 11 through which the threaded shaft 6 passes. A threaded nut 12 is fitted on the threaded shaft 6 and is held against the plate 11 by means of a flange 13. Rotation of the threaded nut 12 causes the threaded shaft 6 and piston 5 attached thereto to move laterally in the forming box 4. A sprocket wheel 14 attached to the threaded nut 12 is driven by a motor (not shown) to provide the desired movement of the piston 5 in the forming box 4.

Figure 2:
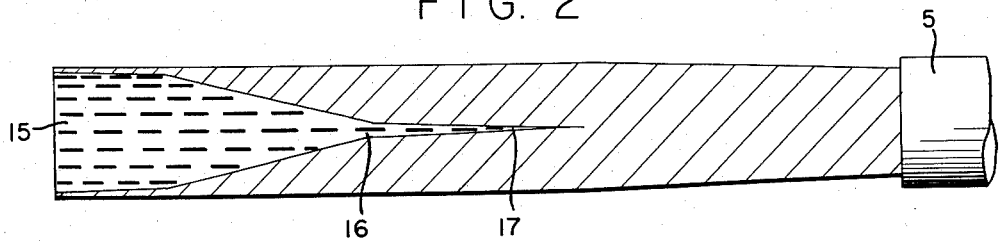

The operation of the device is illustrated further in Figure 2, which shows the profile of a polyoxymethylene resin melt as it passes through the mold. The molten resin at the entrance portion 15 of the mold remains fluid except for a solidified outer shell. As the crystallization proceeds, the next zone (moving forward in the mold) has a cone shaped melt which approaches an apex 16, followed by a needle 17 of semi-crystalline material which does not appear to be physically homogeneous with the solidified portion. As the rod shrinks due to cooling, it withdraws slightly from the wall, and its rate of forward motion is controlled by the piston 5. The rate of motion of the piston is such that the needle 16 stays in a fixed position and forms an angle of not less than 10° and suitably from 10° to 30°. This angle is determined by the rate of motion of the piston, and when the angle is less than about 10°, the needle produces a permanent defect, i.e. a central core having properties differing from the remainder of the rod. On the other hand, when the angle of the needle is greater than 10°, the central core defect can be completely eliminated in the final product. This result arises because molten polymer can be packed into the void created by the shrinkage which takes place during the solidification of the resin. Final packing is accomplished at the end of a cycle, i.e. when the piston is at the forward end of the mold, by stopping the motion of the piston and continuing the operation of the extruder to maintain pressure at the entrance of the mold. This requires slowing down the extruder at the end of each cycle, since the feed of thermoplastic material virtually ceases at that stage. The principal phenomenon occurring in this phase of the process is the retraction of the needle and cone in such a fashion that the entire object is free from any central defect.

The same step is also employed in shaping nylon or other resin in the practice of the invention.

It is to be understood that various modifications of the mechanism hereinabove described can be used. For example, a manifold of forming tubes or molds may be used, so that when one tube is being filled, the other is being emptied by rearward motion of the ram.

It is to be understood also that a wide variety of thermoplastic materials may be used in the practice of the invention, suitable materials being polyolefins, especially linear polyethylene, polyesters, especially bisphenylolpropane polycarbonate, linear polyimides, linear polyamides, chlorofluoroalkene polymers, tetrafluoroethylene-hexafluoropropene copolymers, acrylic and alkacrylic ester polymers, polyacrylonitrile, cellulose esters and ethers, vinyl ester polymers and copolymers, and the like.

The rods produced by the method of the invention have surfaces which are generally smoother than the surfaces of rods produced by methods of the prior art.

One of the advantages of the invention is that it permits annealing of the rod in the mold. Annealing is generally necessary in large diameter rods, because of the large internal stresses which accompany the solidification and shrinkage. Annealing is preferably performed by heating for about 1.5 hours or more at a temperature of about 20° to 75° C. below the melting point of the thermoplastic material, generally at atmospheric pressure.

The invention is highly useful in the manufacture of miscellaneous articles such as gears, machine parts, and the like, which can be made from the large diameter rod.

What is claimed is the following:

An apparatus comprising, in combination, an elongated mold having an inlet end for feed of thermoplastic material, a piston adapted to move lengthwise therein and means attached to said piston to grip the said thermoplastic material as it cools, thus causing it to move with said piston, a cooling jacket exterior to the shaping surface of said mold, a threaded shaft cooperating with a threaded base of a wheel rotatably mounted in a fixed position lengthwise of said mold and means for rotation of said wheel, thus controlling the position of the said piston.

References Cited in the file of this patent
UNITED STATES PATENTS

| 2,280,022 | Banigan et al. | Apr. 14, 1942 |
| 2,719,330 | Stott | Oct. 4, 1955 |

FOREIGN PATENTS

| 201,977 | Australia | May 24, 1956 |

UNITED STATES PATENT OFFICE
CERTIFICATION OF CORRECTION

Patent No. 2,962,760 December 6, 1960

Richard Glenn Alsup et al.

It is hereby certified that error appears in the above numbered patent requiring correction and that the said Letters Patent should read as corrected below.

Column 2, line 30, for "20°" read -- 200° --.

Signed and sealed this 9th day of May 1961.

(SEAL)
Attest:

ERNEST W. SWIDER
Attesting Officer

DAVID L. LADD
Commissioner of Patents